US009976701B2

(12) United States Patent
Behruzi et al.

(10) Patent No.: US 9,976,701 B2
(45) Date of Patent: May 22, 2018

(54) TANK

(71) Applicant: Airbus DS GmbH, Taufkirchen (DE)

(72) Inventors: Kei-Philipp Behruzi, Bremen (DE); Francesco De Rose, Bremen (DE)

(73) Assignee: Airbus DS GmbH, Taufkirchen (DE)

( * ) Notice: Subject to any disclaimer, the term of this patent is extended or adjusted under 35 U.S.C. 154(b) by 0 days. days.

(21) Appl. No.: 15/340,455

(22) Filed: Nov. 1, 2016

(65) Prior Publication Data

US 2017/0130899 A1    May 11, 2017

(30) Foreign Application Priority Data

Nov. 10, 2015  (EP) .................................... 15193782

(51) Int. Cl.
*F17C 1/00* (2006.01)
*F17C 3/04* (2006.01)
*F17C 1/12* (2006.01)

(52) U.S. Cl.
CPC .................. *F17C 3/04* (2013.01); *F17C 1/12* (2013.01); *F17C 2201/0157* (2013.01); *F17C 2201/052* (2013.01); *F17C 2203/012* (2013.01); *F17C 2203/014* (2013.01); *F17C 2203/015* (2013.01); *F17C 2203/032* (2013.01); *F17C 2203/0304* (2013.01); *F17C 2203/0358* (2013.01); *F17C 2205/013* (2013.01); *F17C 2221/033* (2013.01); *F17C 2221/035* (2013.01); *F17C 2223/0161* (2013.01); *F17C 2223/033* (2013.01); *F17C 2223/045* (2013.01); *F17C 2223/047* (2013.01);
(Continued)

(58) Field of Classification Search
CPC ........ F17C 3/04; F17C 1/12; F17C 2203/015; F17C 2223/045; F17C 2223/033; F17C 2223/0161; F17C 2221/035; F17C 2205/013; F17C 2203/0358; F17C 2203/032; F17C 2270/0105; F17C 2201/052; F17C 2201/015; F17C 2223/047; F17C 2270/0168; F17C 2221/033; F17C 2203/0304; F17C 2203/014; F17C 2203/012; F17C 2260/033
USPC ......................................... 220/560.04–560.15
See application file for complete search history.

(56) References Cited

U.S. PATENT DOCUMENTS 3,088,621 A    5/1963   Brown
3,762,175 A *  10/1973  Jones ........................ F17C 3/02
                                                       220/560.12
4,230,057 A   10/1980   Kurz
(Continued)

FOREIGN PATENT DOCUMENTS

EP    2157013     2/2010
GB    1227033     3/1971
(Continued)

OTHER PUBLICATIONS

European Search Report, dated Mar. 17, 2016, priority document.

*Primary Examiner* — Kareen Thomas
(74) *Attorney, Agent, or Firm* — Greer, Burns & Crain Ltd.

(57) ABSTRACT

A tank or tank system for storing a cryogenic liquid exhibiting at least one collecting container with an upper region and a lower region, so as to hold the cryogenic liquid, at least one arrangement for feeding and discharging liquids and at least one arrangement for feeding and discharging gases, wherein the tank further exhibits at least one frame structure comprising a thermal insulation material.

13 Claims, 15 Drawing Sheets

(52) U.S. Cl.
CPC ............... *F17C 2260/033* (2013.01); *F17C 2270/0105* (2013.01); *F17C 2270/0168* (2013.01)

(56) References Cited

U.S. PATENT DOCUMENTS

| | | | | |
|---|---|---|---|---|
| 6,460,574 | B2 * | 10/2002 | Currie | E03F 3/04 138/116 |
| 2010/0058780 | A1 | 3/2010 | Yoo | |
| 2010/0146992 | A1 * | 6/2010 | Miller | F17C 3/04 62/47.1 |
| 2015/0060466 | A1 * | 3/2015 | Lind | B60K 15/03 220/560.1 |

FOREIGN PATENT DOCUMENTS

| | | |
|---|---|---|
| GB | 1250220 | 10/1971 |
| WO | 2006014301 | 2/2006 |
| WO | 2011129770 | 10/2011 |

\* cited by examiner

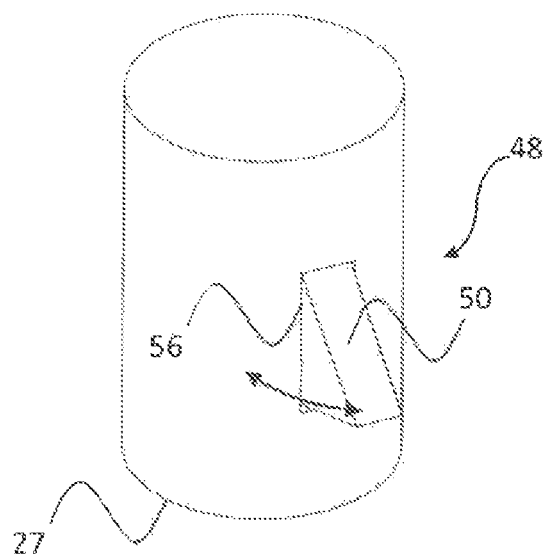
FIG. 14a
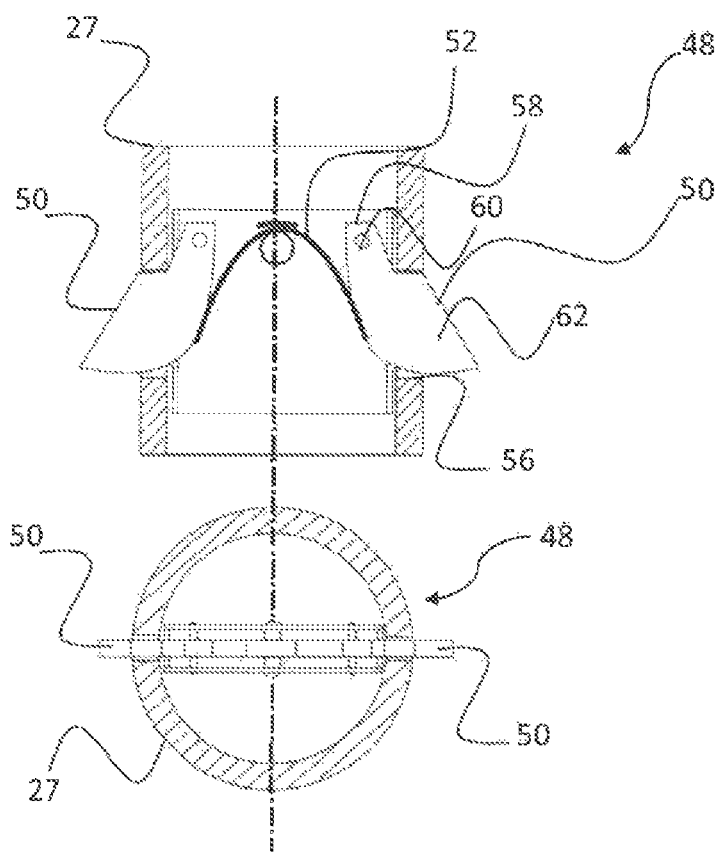
FIG. 14b
FIG. 14c

TANK

CROSS-REFERENCES TO RELATED APPLICATIONS

This application claims the benefit of the European patent application No. 15193782.8 filed on Nov. 10, 2015, the entire disclosures of which are incorporated herein by way of reference.

BACKGROUND OF THE INVENTION

The invention relates to a tank or a tank system, in particular to a tank for transporting cryogenic liquids in tankers.

The transport of liquid gasses by water has in the meantime developed into a sophisticated branch of industry, which has at its disposal a large fleet of tankers, a network of export and import terminals, along with a wealth of knowledge and experience from the various individuals participating in the processes. Gas tankers are equipped with specific features that they share with other tankers used for conveying bulk liquid cargoes, such as oil and chemicals.

Liquid tankers today represent a flexible alternative to the transport of liquid gas in pipelines, and are used for the maritime transport of liquefied gases as bulk cargo in fixedly installed cargo tanks. Apart from technical gases, transported gases primarily include liquefied natural gases (LNG—liquefied natural gas) and liquefied gases (LPG—liquefied petroleum gas).

Ship tanks for liquefied gases can basically be divided into two categories. There are the "non-freestanding tanks," such as the prismatic membrane tanks, and the "freestanding tanks," for example the spherical MOSS tanks. The membrane tanks are characterized by the fact that they adapt to the outer ship geometry and—by comparison to spherical MOSS tanks—better utilize the available space. In comparison to the described MOSS system, this makes these ships lighter or smaller given the same load. However, the disadvantage here is that partial loads, e.g., between a 10% and 70% fill level, are not permissible, since the arising sloshing movements of the liquid can damage the tank walls. In addition, the pressurization possible on the tank is low. Cryogenic liquids can thus be transported only at approximately an ambient pressure. As opposed to when being stored in spherical tanks, they are therefore not supercooled in their saturation state during transport, and thus impaired by elevated evaporation losses. Common evaporation rates measure approx. 0.15% per day. Minimizing evaporation losses is the primary objective for this transport container. The efficiency of liquid transport and potentially the burden on the environment depend heavily on the evaporation losses.

FIGS. 1 and 2 describe a conventional membrane tank 1, which commonly exhibits a prismatic basic shape 2. The membrane is constructed in such a way that it can absorb higher temperature-induced expansions owing to the material properties and expediently arranged folds and beads. For example, temperatures of −164° C. to −161° C. arise during the transport of liquefied gases given LNG as the cargo. The temperature inside the tank can reach as high as 40° C. or more while the ship is docked at a shipyard.

A line 3 lying on the interior—the so-called "pump tower"—is used to fill and empty the membrane tank 1. As may be gleaned from FIG. 2, a typical liquefied gas tanker consists of a series of several prismatic tanks 1, which are separated from each other by intermediate areas 4 called "cofferdams." The temperature in these intermediate areas 4 is generally warm by comparison to the supercooled liquids.

Due to their prismatic shape 2, these membrane tanks 1 are heavily influenced by the sloshing movements of the liquids, so that damages can arise, in particular in proximity to corners and edges, where especially high sloshing forces can arise.

It is generally known that sloshing forces can be reduced by additionally installing various baffles. For example, WO 2011/129770 A1 describes a system in which the free liquid surface is stabilized by incorporating an additional plate. WO 2006/014301 A1 focuses on the same problem by incorporating systems for reducing the sloshing forces in the corners of the tanks.

In general, such damping systems are characterized by the fact that they are applied to the insulating wall structure to elevate the evaporation rates. In actual fact, the heat bridges this produces are not conducive to the insulating effect of the tank. In addition, it must be considered that the filling line 3 of the tank 1 allows additional heat to penetrate.

A majority of the heat penetrating into the tank does so via the tank cover 5, which generally is distinctly warmer than the liquid stored in the tank. If these surfaces are briefly wetted with liquid by sloshing movements, this increases the evaporation rate.

Additional losses due to thermal radiation as well as thermal conduction through the gas result in elevated evaporation losses. For purposes of optimized storage, use is therefore made of land-bound storage tanks 6 for cryogenic fuels with suspended false ceilings 7, for example which are suspended on ropes 8. False ceilings 7 significantly reduce the evaporation rate. Such a tank is depicted on FIG. 3. In the type at hand, however, its implementation is not suitable in a ship tank for transporting liquids in membrane tanks.

SUMMARY OF THE INVENTION

Therefore, an object of the invention is to indicate a tank or tank system that eliminates or at least ameliorates the aforementioned problems, and takes into account the swaying movements of the ship and influence of the sloshing liquid in the tank.

The tank according to the invention for storing a cryogenic liquid exhibits at least one collecting container for accommodating the cryogenic liquid with an upper region and a lower region for containing the cryogenic liquid.

The tank further exhibits at least one arrangement for feeding and discharging liquids and at least one arrangement for feeding and discharging gases. In particular, the tank further exhibits a frame structure comprising a thermal insulation material.

Achieved as a result is a reduction in the evaporation rates. This reduction combined with a higher charging of liquid distinctly improves the efficiency of the transportation means.

The thermal insulation material can advantageously be a multilayer insulation (MLI). This material is especially suited for insulating lines for cryogenic liquids or gases.

In an embodiment of the invention, the above region of the collecting container comprising pieces of flat surfaces, which when assembled form an additional volume.

In another embodiment of the invention, the frame structure exhibits a frame with a transverse rib and a foil made of a thermal insulation material or an MLI, wherein the foil is sewed on a fabric, and the fabric is enclosed on both sides by the foil. As a consequence, an applied force can be transmitted by the fabric, and the MLI is not loaded or destroyed.

In order to achieve stability for the structure, the upper region of the frame lies flatly in a horizontal position and is fixed to the container by means of vertical fastening elements.

In yet another embodiment of the invention, the vertical fastening elements form plate-shaped bearing surfaces or ledges, on which the frame structure is placed and secured by a punched disk by means of two anchors each. As a consequence, the frame structures are fixed in place, wherein enough clearance still remains to offset the arising thermal expansions of the materials.

In particular, the anchors form a strong and releasable connection due to a spring mechanism. As a consequence, the frame structures can be assembled or disassembled very quickly and easily.

In an embodiment of the invention, the tank exhibits a plurality of frame structures, which lie parallel one above the other and fill the upper region.

In order to improve the insulation effect, the frame structure further exhibits a lower portion, which is shielded from below by metallic corrugated sheets.

In a special embodiment of the invention, the tank exhibits a plurality of containers which are arranged in a row side by side and separated from one another by an intermediate region. This increases the vehicle load.

In the embodiment just mentioned, the arrangement for feeding and discharge liquids and the arrangement for feeding and discharging gases are arranged in the intermediate region of two adjacent containers, so as to introduce the fewest possible baffles into the tank, which has a positive effect on the heat penetrating into the tank.

BRIEF DESCRIPTION OF THE DRAWINGS

In addition, advantages and functionalities of the invention may be gleaned from the following description of selected exemplary embodiments based on the figures. These show.

DETAILED DESCRIPTION OF THE PREFERRED EMBODIMENTS

Figure 1:
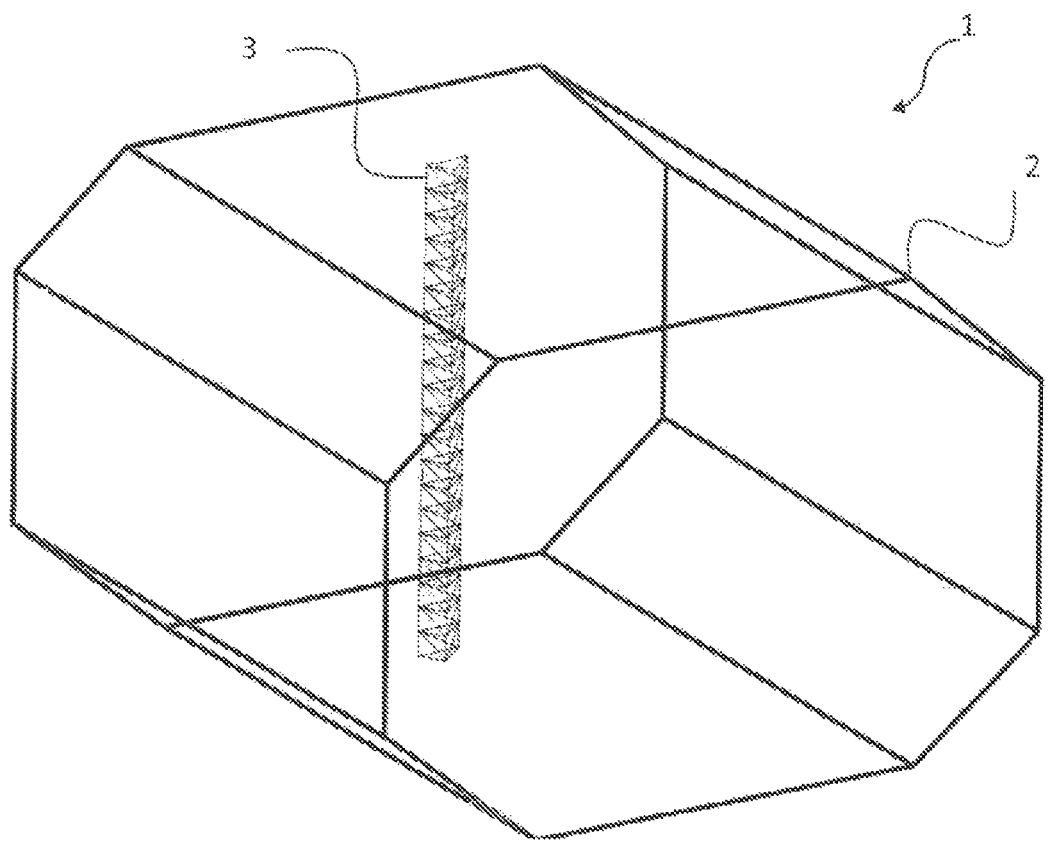
FIG. 1 is a view of a liquefied gas tank according to prior art.
Figure 2:
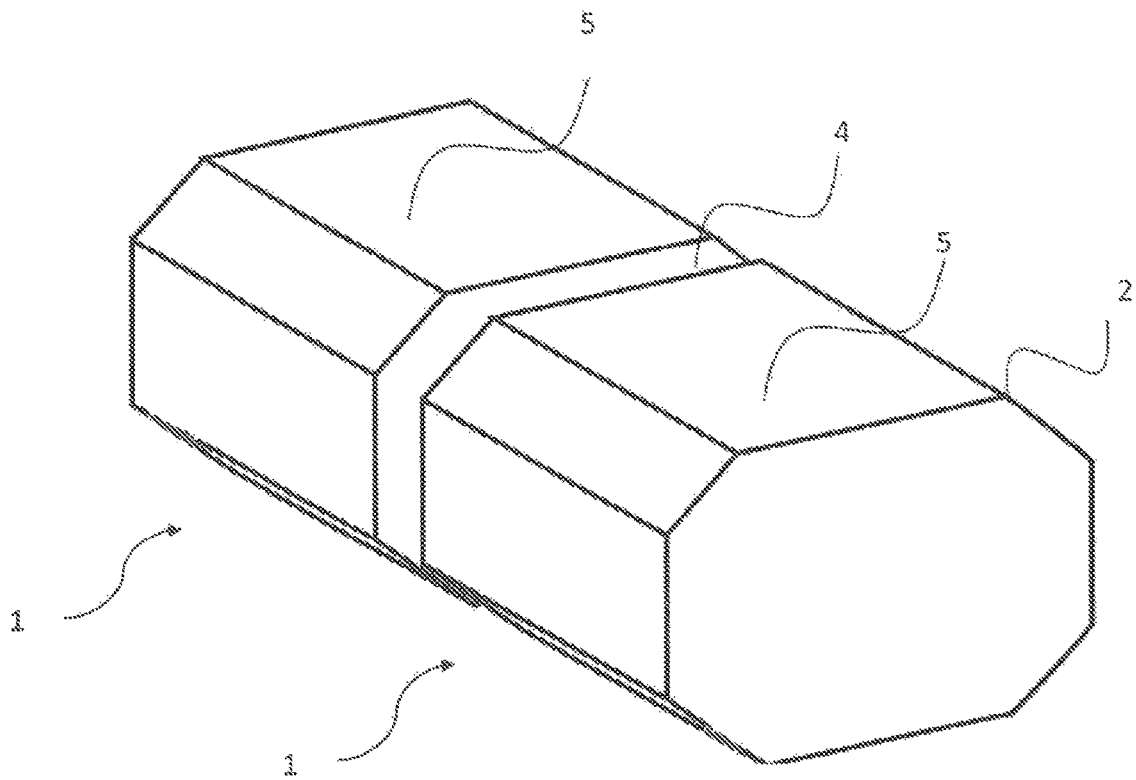
FIG. 2 is a view of a structure of two adjoining liquefied gas tanks according to prior art.
Figure 3:
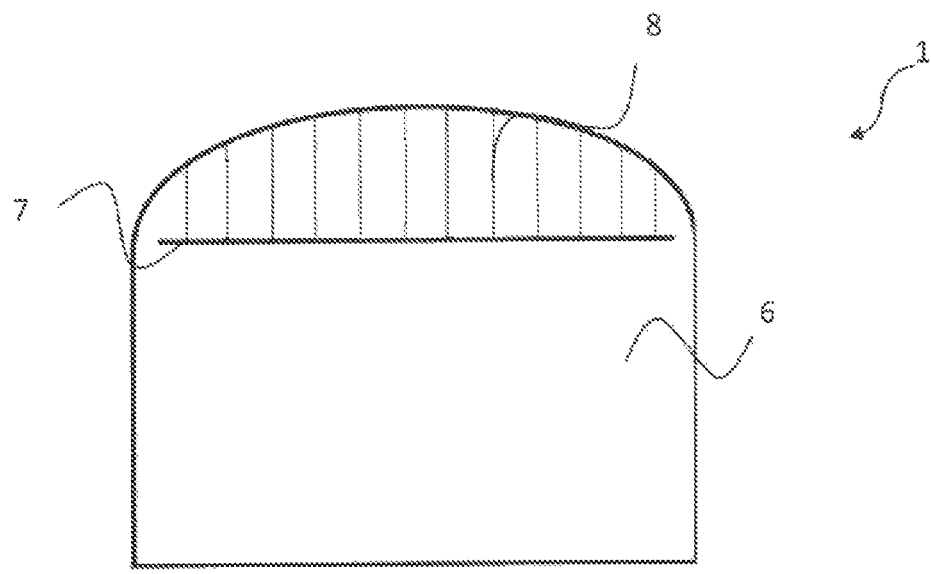
FIG. 3 is a view of the structural design of a land-bound storage tank according to prior art.
Figure 4:
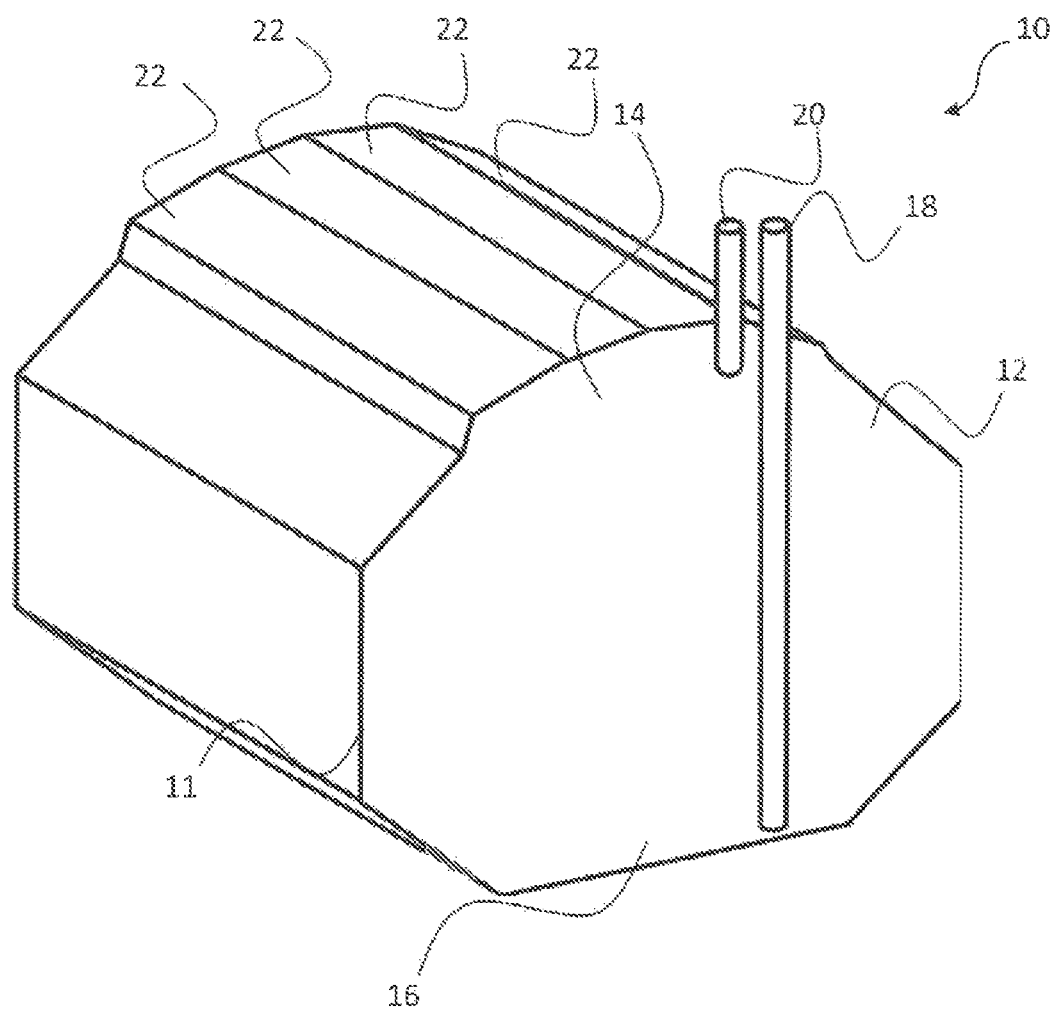
FIG. 4 is a view of a liquefied gas tank according to an embodiment of the invention.

FIG. 4 illustrates a tank or tank system 10 with a prismatic shape 11 for storing a cryogenic liquid. The tank 10 exhibits a collecting container 12 with an upper region 14 and a lower region 16. The tank 10 further exhibits at least one arrangement 18 for feeding and discharging liquids and at least one arrangement 20 for feeding and discharging gases. As evident from the figure, the upper region 14 is divided into pieces of flat surfaces 22. This yields an additional volume 24 (FIG. 5) in the upper region 14 of the container 12.

Figure 5:
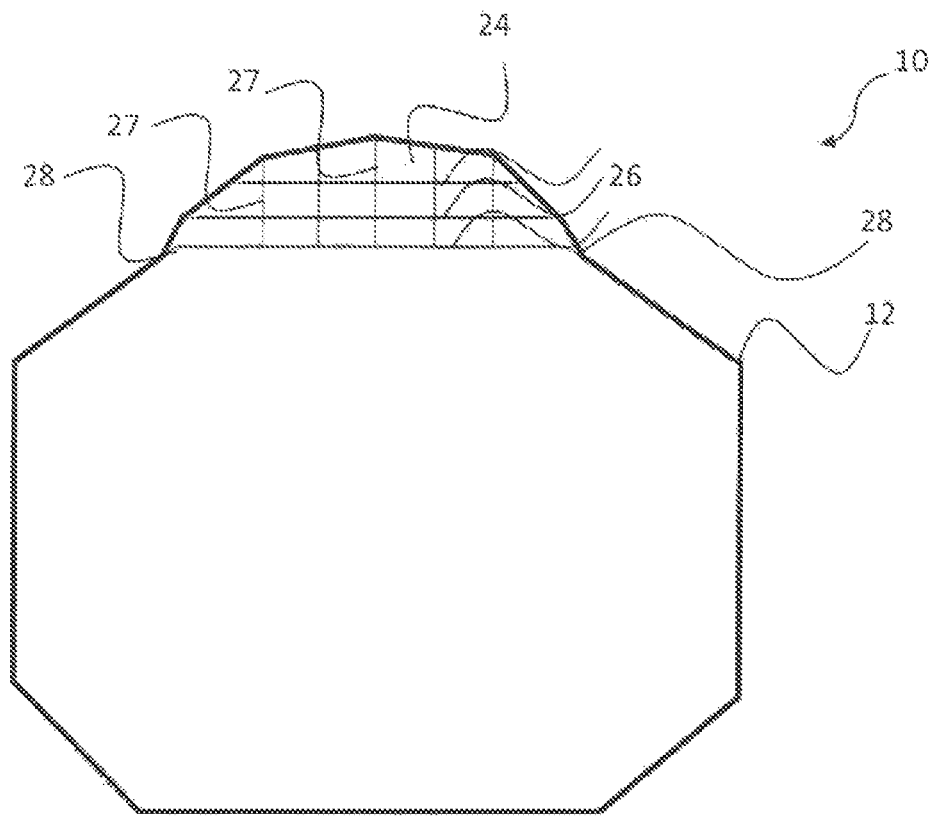
FIG. 5 is a cross-sectional view of a liquefied gas tank according to an embodiment of the invention.

As shown in particular on FIG. 5, layered surfaces or frame structures 26 are horizontally secured in the additional volume 24. The surfaces 26 are held on the upper region 14 of the container 12 by vertical pipes 27 and additional fixing means 28. The number of surfaces 26 can vary by tank 10. The surfaces 26 comprising frame structures 26 (FIG. 7), whose size is easy to handle during tank manufacture.

Figure 6:
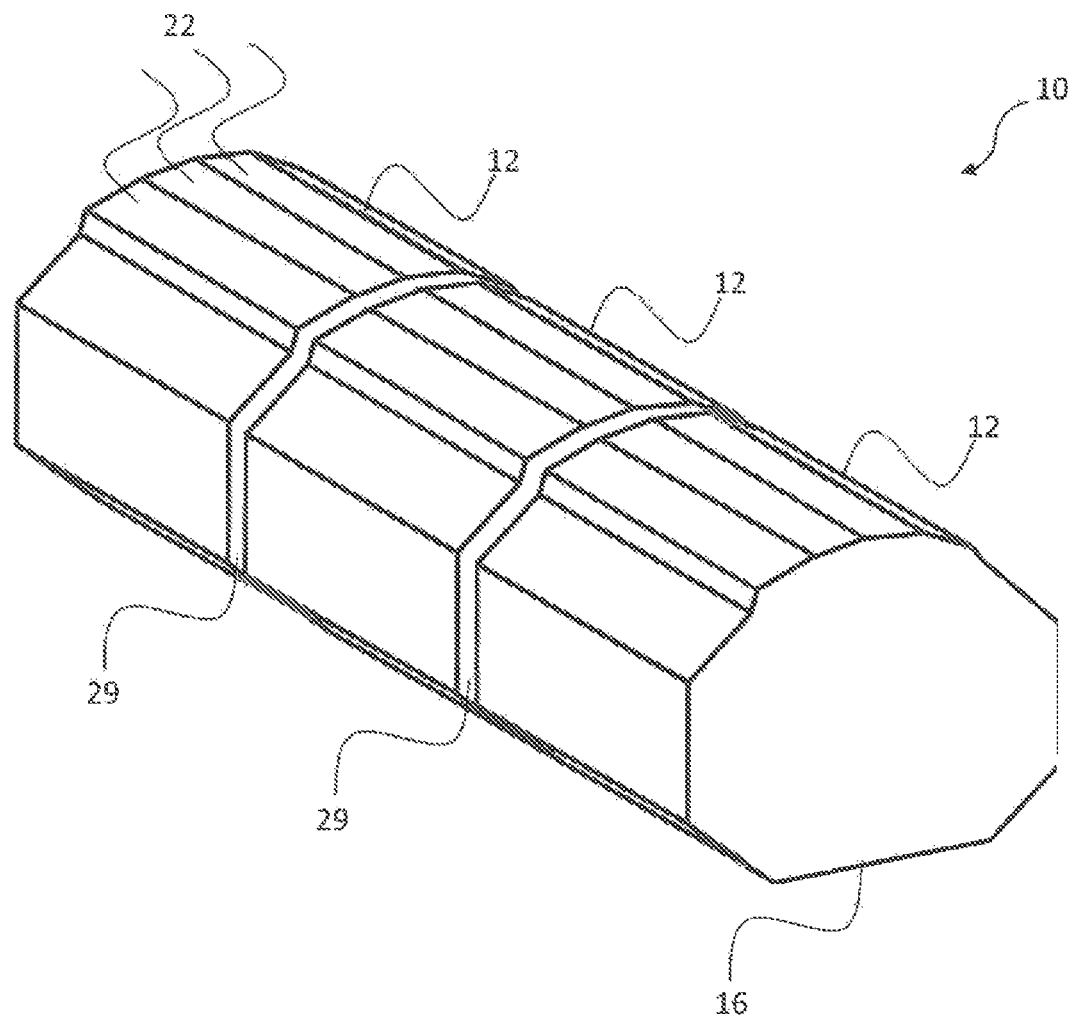
FIG. 6 is a view of a structure of three adjoining liquefied gas tanks according to an embodiment of the invention.

FIG. 6 shows a special embodiment of the invention in which the tank 10 comprising several, here for example three, adjacent collecting containers 12. Located between two adjoining containers 12 here is an intermediate region 29, which serves to separate the lateral walls of the containers 12.

Figure 7:
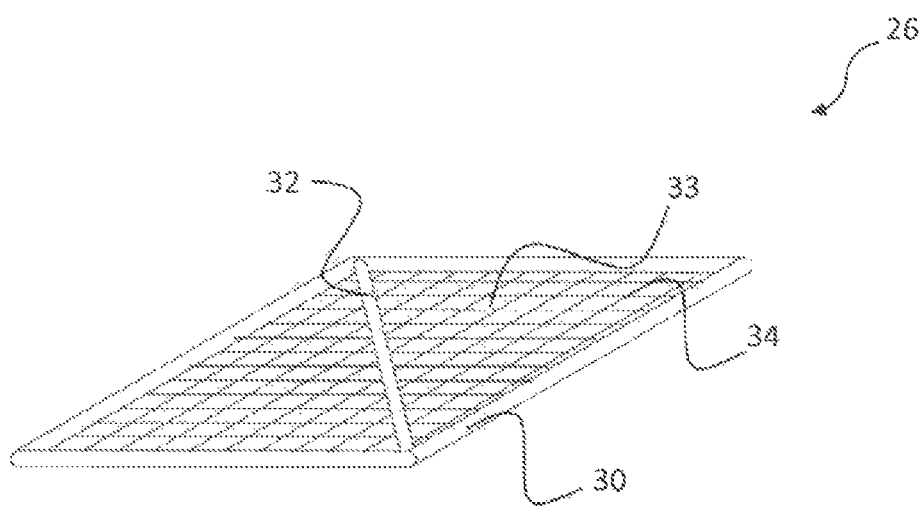
FIG. 7 is a view of a frame structure according to an embodiment of the invention.

FIG. 7 illustrates the construction of a frame structure 26, which exhibits a frame 30 comprised of non-metallic materials, for example in the form of fiberglass tubes or other cryo-compatible materials. The structures should exhibit a poor thermal conductivity, so that the heat introduced into the tank 10 is low. A transverse rib 32 is here inserted for reinforcing the frame structure 26. The frame 30 and transverse rib 32 are joined with a foil 33 comprising multilayer insulation (MLI) material sewn to a fabric 34. The MLI material is known from aerospace, and used for insulating satellites in a vacuum. It comprises a row of very thin aluminum foils. For stability reasons during use in ship tanks, these foils 33 are additionally sewn to the mentioned fabric 34. Let it here be noted that the fabric 34 is enclosed on both sides by MLI, so that the MLI frame structure 26 has metallic outer surfaces on either side. The fabric 34 can comprise any poorly thermally conductive material, which is compatible with the liquid and low temperatures of about −160° C. The frame 30 along with the transverse rib 32, foil 33 comprised of MLI material and the fabric 34 thus makes up the MLI frame structure 26.

Figure 8:
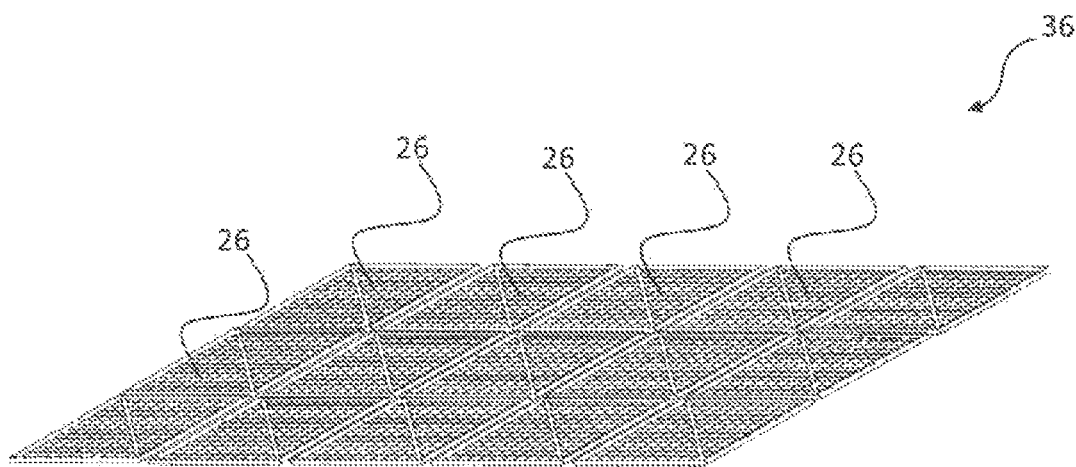
FIG. 8 is a view of assembled frame structures according to an embodiment of the invention.

FIG. 8 shows a horizontal arrangement 36, in which a plurality of frame structures 26 are assembled side by side and form a large, flat surface. The frame structures 26 are here joined together for purposes of space optimization, so as to fill the upper region 14 of the container 12.

Figure 9:
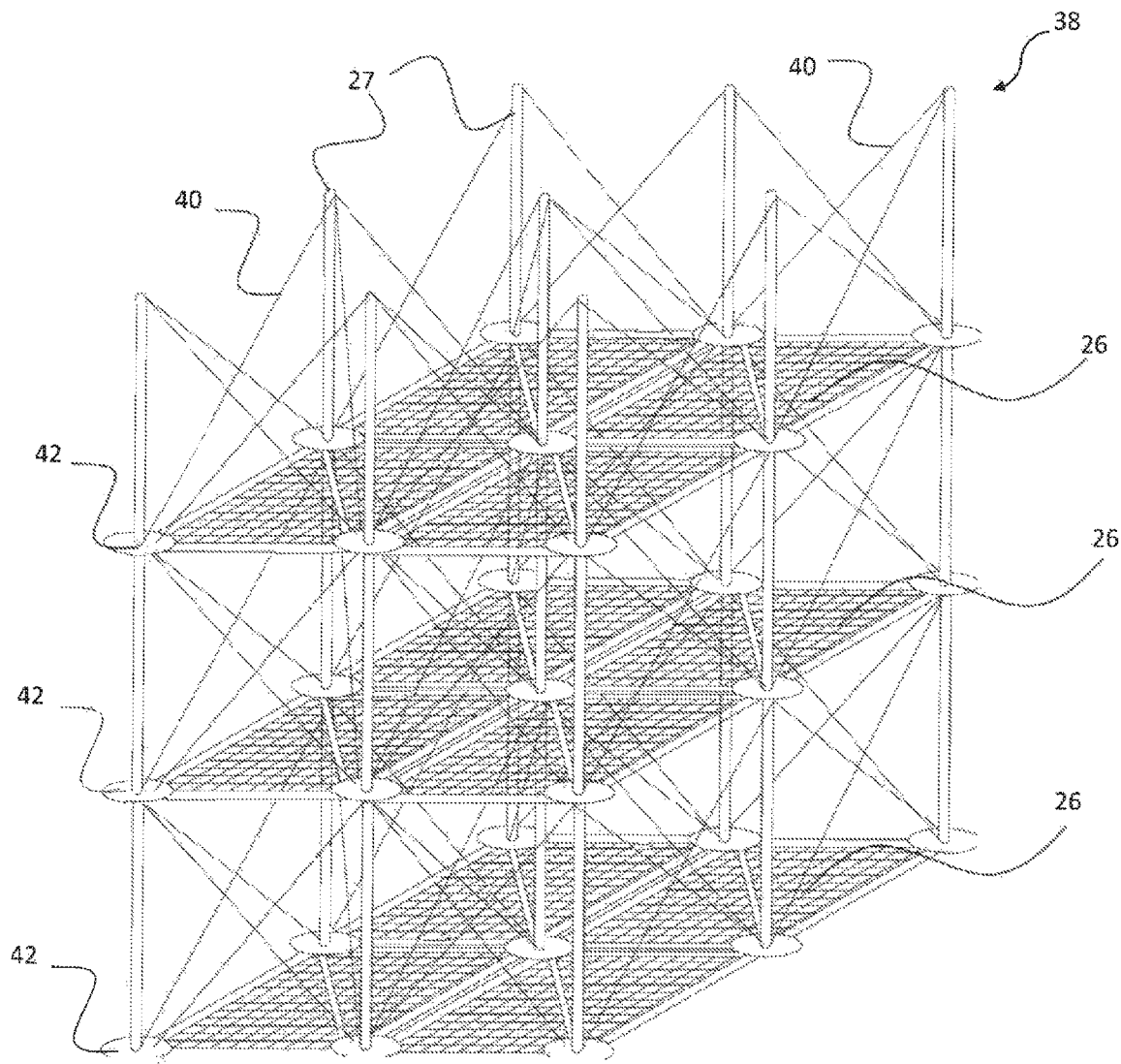
FIG. 9 is a view of a construction of multilayer frame structures according to an embodiment of the invention.

FIG. 9 illustrates a vertical arrangement 38, in which the frame structures 26 assembled side by side are secured one above the other in multiple layers. In particular, FIG. 9 shows a construction with three layers of frame structures 26. In order to fix the frame structures 26 into their position, use is made of a rope structure 40 in conjunction with the vertical pipes or braces 27, which comprises any poorly thermally conductive material. The structure 40 is fixed in the tank 10 with an additional fixation means 28, for example ropes. The material comprising the rope structure 40 can be as desired. For example, the uppermost braces 27 are joined with the flat tank wall elements 22 by means of eyelets provided specifically for this purpose (not shown). Provided as additional fixing means at the corners of each frame structure 26 is a punched disk 42, which is displaceably secured to the vertical brace 27.

Figure 10:
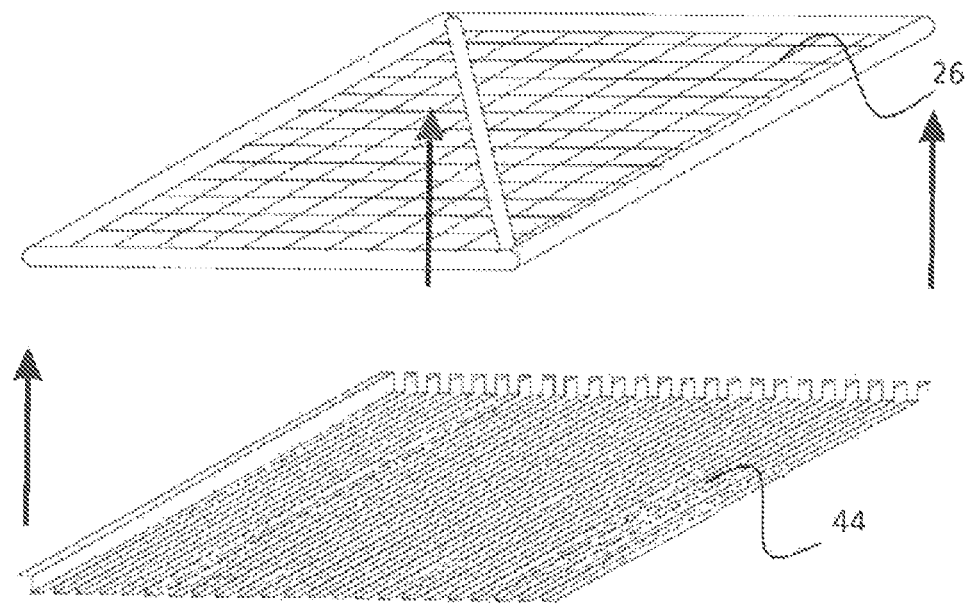
FIG. 10 is a view of a construction of the lowermost frame structure according to an embodiment of the invention.
Figure 11:
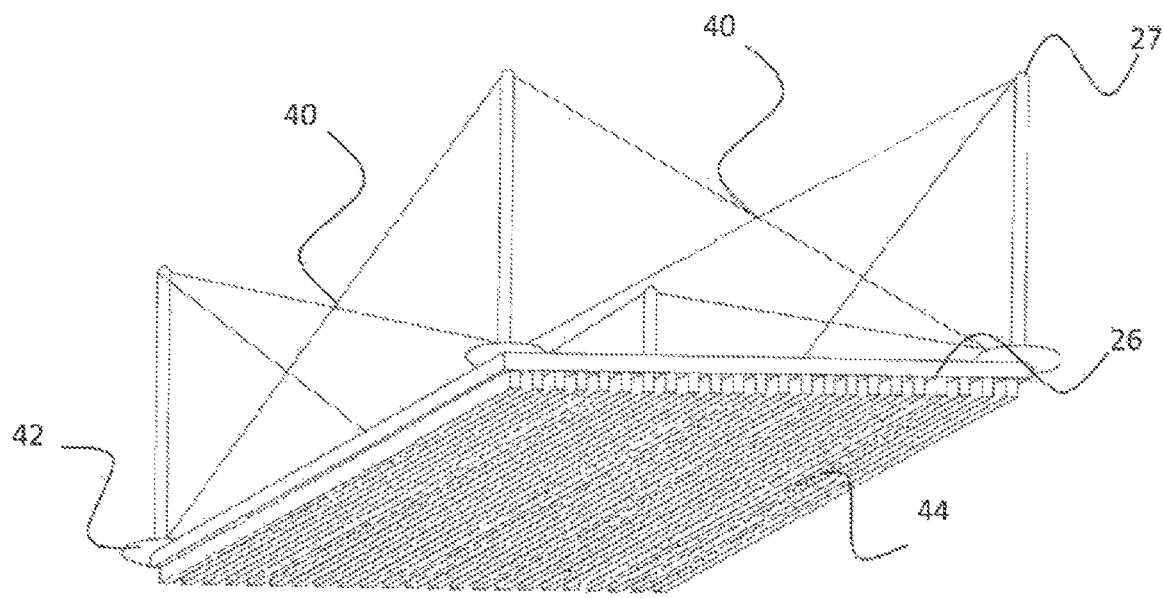
FIG. 11 is a view of a construction of the lowermost frame structure in an assembled state according to an embodiment of the invention.

The lowermost layer of the frame structures 26 is sealed by a metallic corrugated sheet 44, so as to protect the overlying structures against the sloshing liquid. The upper tank region 14 is here not sealed away from the remaining tank volume, but rather open. FIGS. 10 and 11 illustrate the construction of the lowermost frame structure 26 in a disassembled and assembled state.

Figure 12:
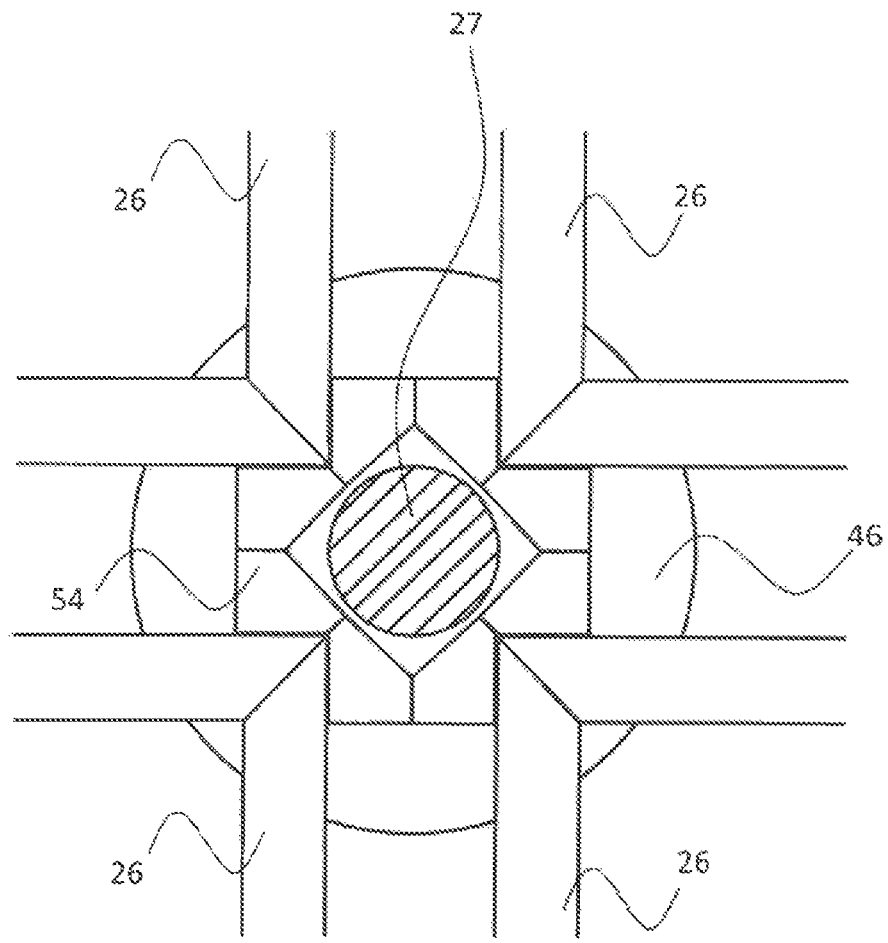
FIG. 12 is a view of the first step for assembling the frames according to an embodiment of the invention, FIG. 13a, 13b both are a view of the second (a) and third (b) step for assembling the frames according to an embodiment of the invention, FIG. 14a, 14b, 14c all show a view of the construction of the means for fixing the frame structure according to an embodiment of the invention.
Figure 13A:
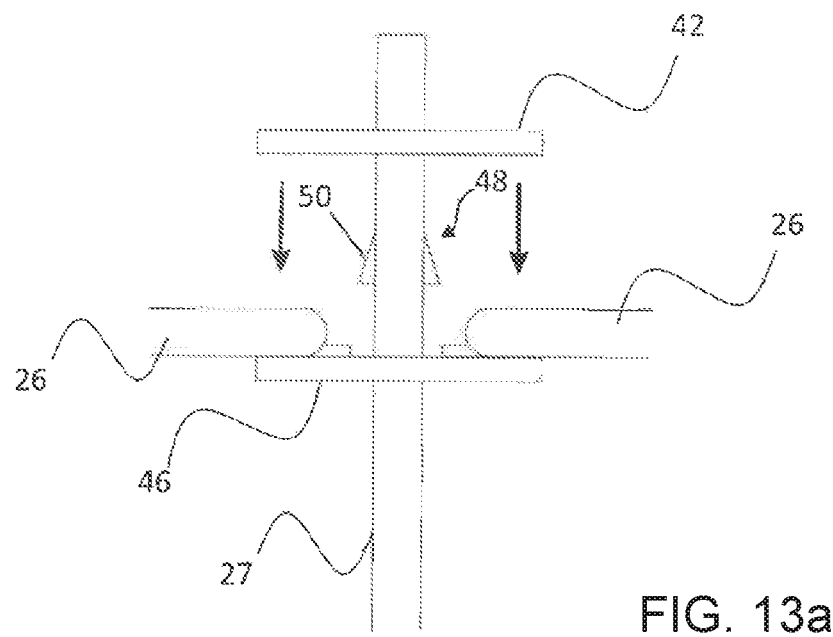
Figure 13B:
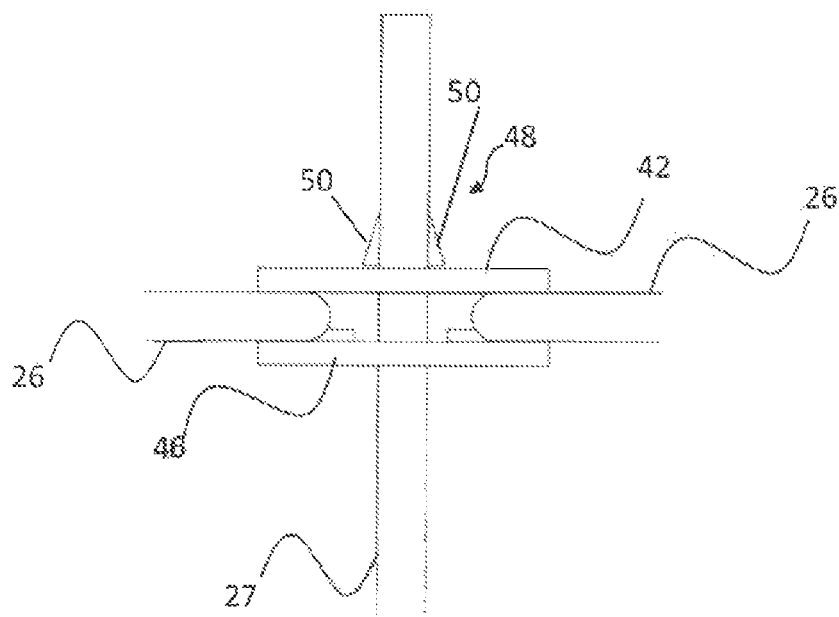

FIGS. 12, 13a and 13b show the assembly of the frame structures 26 and vertical braces 27. This assembly is configured in such a way that these elements can be mounted without any major outlay, and later also removed again as needed. The vertical braces 27 form ledges 46 along the height of the frame structures 26, on which the corners of the frame structures 26 are placed. In the first step (FIG. 12), the frame structures 26 are arranged in such a way that the lower portions of the corners of the respective four frame structures 26 are placed on a ledge 46 of a brace 27. In the second step (FIG. 13a), the punched disk 42 is pushed downward, and held by a blocking mechanism 48, so that the corners of the respective four frame structures 26 are clamped between the punched disk 42 and ledge 46.

The blocking mechanism 48 comprises two opposing anchors 50 and a spring 52. The two anchors 50 are outwardly pressed by the springs 52. When the punched disk 42 is guided over the anchors 50, it latches, and is thereby fixed in place. The punched disk 42 can again be manually released by pressing in the anchors 50.

The frame structures 26 form ledges 54 at their corners, which adapt to the adjacent frame structures 26 and the vertical brace 27, and are thereby fixed in their position.

FIGS. 14a, 14b and 14c illustrate the blocking mechanism 48 in detail. In particular, FIG. 14a shows the movement of the anchor 50 relative to the brace 27 (double arrow). The vertical brace 27 here exhibits two opposing openings 56, which cause the anchors 50 pressed by the spring 52 to protrude. FIGS. 14b and 14c show a cross section in the longitudinal and transverse direction of the brace 27, so as to explain the details of the blocking mechanism 48. The two anchors 50 each exhibit a first portion 58, which is fixed inside the brace 27 by a fastening means 60, and a second portion 62, which protrudes through the opening 56 and blocks the punched disk 42. The fastening means 60 permits the anchor 50 to pivot, so that the anchor 50 is outwardly pressed by the spring 52 in a resting state, and the bolt 50 is inwardly pressed through the punched disk 42 in a pressed state.

Figure 15:
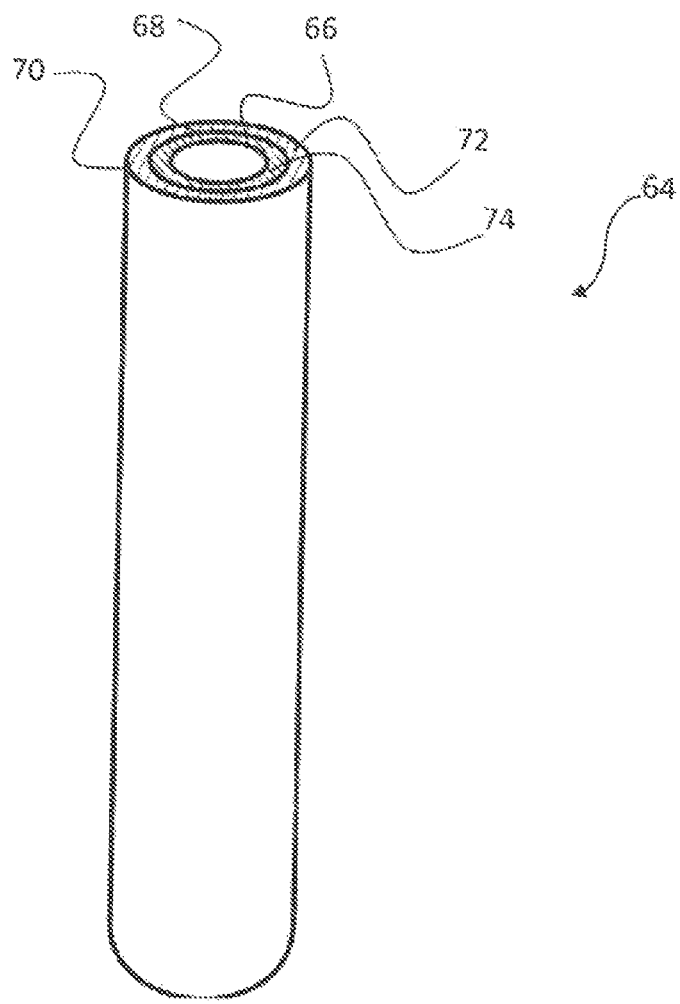
FIG. 15 is a view of a construction of the feeding and discharging lines according to an embodiment of the invention.

FIG. 15 shows an embodiment in which the arrangement for feeding and discharging liquids and gases comprises a multiple pipe structure 64. The pipes comprise at least three telescoping pipes 66, 68, 70, which are separated from each other by insulating layers 72 and 74. The latter are secured in the intermediate regions 29 between the tanks 10, and fixed in place there.

The tank 10 according to the present invention can be filled up to the height of the corrugated sheets 44. In contrast to comparable conventional tanks 1, this permits an increased load. A ship of the same size can hence transport more liquid with the invention, which makes it more cost-effective.

The implementation of the invention is not limited to the examples described above and highlighted aspects, but rather is also possible in a plurality of modifications lying within the realm of professional activities.

Disclosed is a tank or tank system for storing a cryogenic liquid, exhibiting at least one collecting container with an upper region and a lower region, so as to hold the cryogenic liquid, at least one arrangement for feeding and discharging liquids and at least one arrangement for feeding and discharging gases, wherein the tank further exhibits at least one frame structure made out of a thermally insulating material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

1 Conventional tank
2 Prismatic tank
3 Line (power tower)
4 Intermediate area (cofferdam)
5 Tank cover
6 Storage tank
7 False ceilings
8 Ropes
10 Tank or tank system
11 Prismatic shape
12 Collecting container
14 Upper region of container
16 Lower region of container
18 Arrangement for feeding and discharging liquids
20 Arrangement for feeding and discharging gases
22 Flat surfaces
24 Additional volume
26 Horizontal surface/frame structure
27 Vertical pipe/vertical brace
28 Additional fixing means
29 Intermediate area
30 Frame
32 Transverse rib
33 ML material
34 Fabric
36 Horizontal arrangement
38 Vertical arrangement
40 Rope structure
42 Punched disk
44 Corrugated sheet
46 Brace ledge
48 Blocking mechanism
50 Anchor
52 Spring 54 Frame structure ledge
56 Opening
58 First portion of anchor
60 Fastening means
62 Second portion of anchor
65 Pipe structure
66, 68, 70 Pipe
72, 74 Insulating layer

The invention claimed is:

1. A tank for storing a cryogenic liquid, comprising:
    at least one collecting container with an upper region and a lower region for accommodating the cryogenic liquid;
    at least one arrangement for feeding and discharging liquids; and
    at least one arrangement for feeding and discharging gases; and
    at least one frame structure made of a thermal insulation material,
    wherein the frame structure has a frame with a transverse rib and a foil made of a thermal insulation material, wherein the foil is sewed on a fabric and the fabric is enclosed on both sides by the foil.

2. The tank according to claim 1, wherein the thermal insulation material is a multi-layer insulation.

3. The tank according to claim 1, wherein the upper region comprises pieces of flat surfaces which, when assembled, form an additional volume.

4. The tank according to claim 1, wherein in the upper region, the frame structure lies flatly in a horizontal position and is fixed to the container by vertical fastening elements.

5. The tank according to claim 1, wherein the tank has a plurality of frame structures which lie parallel one above the other and fill the upper region.

6. The tank according to claim 1, wherein the frame structure has a lower portion which is shielded from below by metallic corrugated sheets.

7. The tank according to claim 1, wherein the tank has a plurality of containers which are arranged in a row side by side and are separated from one another by an intermediate region.

8. The tank according to claim 4, wherein the vertical fastening elements form plate-shaped bearing surfaces on which the frame structure is placed and is secured by a punched disk by means of, in each case, two anchors.

9. The tank according to claim 8, wherein the anchors form a strong and releasable connection due to a spring mechanism.

10. The tank according to claim 7, wherein the arrangement for feeding and discharging liquids and the arrangement for feeding and discharging gases are arranged in the intermediate region.

11. A tank for storing a cryogenic liquid, comprising:
    at least one collecting container with an upper region and a lower region for accommodating the cryogenic liquid;
    at least one arrangement for feeding and discharging liquids; and
    at least one arrangement for feeding and discharging gases; and
    at least one frame structure made of a thermal insulation material,
    wherein in the upper region, the frame structure lies flatly in a horizontal position and is fixed to the container by vertical fastening elements
    wherein the vertical fastening elements form plate-shaped bearing surfaces on which the frame structure is placed and is secured by a punched disk by means of, in each case, two anchors.

12. The tank according to claim 11, wherein the anchors form a strong and releasable connection due to a spring mechanism.

13. A tank for storing a cryogenic liquid, comprising:
    at least one collecting container with an upper region and a lower region for accommodating the cryogenic liquid;
    at least one arrangement for feeding and discharging liquids; and
    at least one arrangement for feeding and discharging gases; and
    at least one frame structure made of a thermal insulation material,
    wherein the tank has a plurality of containers which are arranged in a row side by side and are separated from one another by an intermediate region,
    wherein the arrangement for feeding and discharging liquids and the arrangement for feeding and discharging gases are arranged in the intermediate region.

* * * * *